(12) United States Patent
Grawrock et al.

(10) Patent No.: US 7,028,149 B2
(45) Date of Patent: Apr. 11, 2006

(54) SYSTEM AND METHOD FOR RESETTING A PLATFORM CONFIGURATION REGISTER

(75) Inventors: David W. Grawrock, Aloha, OR (US); James A. Sutton, II, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 10/112,124

(22) Filed: Mar. 29, 2002

(65) Prior Publication Data
US 2003/0188113 A1    Oct. 2, 2003

(51) Int. Cl.
*G06F 13/00* (2006.01)
(52) U.S. Cl. .................. 711/156; 711/163; 711/165; 711/166; 711/100; 711/101; 711/104; 711/105; 711/109; 711/111; 711/154; 713/164; 713/165; 713/166; 713/169; 713/170; 713/193; 710/5; 710/15; 710/16; 365/189.12; 365/195; 365/196; 365/212
(58) Field of Classification Search ........ 713/176–200, 713/164–166, 156, 169–170; 711/163–166, 711/156, 100, 104–105, 109–111, 101; 365/189.12, 365/195–196, 212; 710/5, 15–16
See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigan et al. |
| 4,430,709 A | 2/1984 | Schleupen |
| 4,521,852 A | 6/1985 | Guttag |
| 4,571,672 A | 2/1986 | Hatada et al. |

(Continued)

FOREIGN PATENT DOCUMENTS

DE        4217444        12/1992

(Continued)

OTHER PUBLICATIONS

Heinrich, J., Memory Management "MIPS R4000 Microprocessor User's Manual,"Apr. 1, 1993, MIPS, Mt. View, XP002184449, pp. 61-97.

(Continued)

*Primary Examiner*—B. James Peikari
*Assistant Examiner*—Zhuo H. Li
(74) *Attorney, Agent, or Firm*—Erik M. Metzger

(57) ABSTRACT

A method and apparatus for resetting and modifying special registers in a security token is described. In one embodiment, a register may be reset when a reset flag is true when a special transmission on a bus demonstrates the mutual locality of the associated processor and chipset. A modify flag may also be used to indicate whether the register contents may be modified. Modifications may also be dependent upon demonstration of mutual locality.

13 Claims, 6 Drawing Sheets

U.S. PATENT DOCUMENTS

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A * | 1/1992 | Hackbarth .................. 711/164 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |

| | | | |
|---|---|---|---|
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1* | 10/2002 | Drews | 713/176 |
| 6,463,537 B1 | 10/2002 | Tello | |
| 6,499,123 B1 | 12/2002 | McFarlane et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B1 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England | |
| 6,678,825 B1 | 1/2004 | Ellison et al. | |
| 6,684,326 B1 | 1/2004 | Cromer et al. | |
| 2001/0021969 A1 | 9/2001 | Burger et al. | |
| 2001/0027511 A1* | 10/2001 | Wakabayashi et al. | 711/163 |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0026576 A1* | 2/2002 | Das-Purkayastha et al. | 713/156 |
| 2002/0147916 A1* | 10/2002 | Strongin et al. | 713/193 |
| 2002/0166061 A1* | 11/2002 | Falik et al. | 713/200 |
| 2002/0169717 A1 | 11/2002 | Challener | |
| 2003/0018892 A1 | 1/2003 | Tello | |
| 2003/0074548 A1* | 4/2003 | Cromer et al. | 713/1 |
| 2003/0084285 A1* | 5/2003 | Cromer et al. | 713/164 |
| 2003/0115453 A1 | 6/2003 | Grawrock | |
| 2003/0126442 A1 | 7/2003 | Glew | |
| 2003/0126453 A1* | 7/2003 | Glew et al. | 713/193 |
| 2003/0159056 A1* | 8/2003 | Cromer et al. | 713/193 |
| 2003/0188179 A1* | 10/2003 | Challener et al. | 713/193 |
| 2003/0196085 A1 | 10/2003 | Lampson et al. | |
| 2004/0117539 A1 | 6/2004 | Bennett et al. | |

FOREIGN PATENT DOCUMENTS

| | | | |
|---|---|---|---|
| EP | 0473913 | | 3/1992 |
| EP | 0 892 521 A2 | | 1/1999 |
| EP | 0930567 A | | 7/1999 |
| EP | 0 961 193 A2 | | 12/1999 |
| EP | 0 965 902 A2 | | 12/1999 |
| EP | 1030237 | | 8/2000 |
| EP | 1 055 989 A1 | | 11/2000 |
| EP | 1 056 014 A1 | | 11/2000 |
| EP | 1 085 396 A1 | | 3/2001 |
| EP | 1146715 | | 10/2001 |
| EP | 1 271 277 A2 | | 1/2003 |
| EP | PCT/US 03/08764 | * | 6/2004 |
| WO | WO 95/24696 | | 9/1995 |
| WO | WO 98/12620 | | 9/1996 |
| WO | WO 9729567 | | 8/1997 |
| WO | WO9834365 A | | 8/1998 |
| WO | WO9844402 | | 10/1998 |
| WO | WO9905600 | | 2/1999 |
| WO | WO9909482 | | 2/1999 |
| WO | WO 99/18511 | | 4/1999 |
| WO | WO9957863 | | 11/1999 |
| WO | WO 99/65579 | | 12/1999 |
| WO | WO 99/65579 A1 | | 12/1999 |
| WO | WO 00/21238 | | 4/2000 |
| WO | WO0062232 | | 10/2000 |
| WO | WO 0127723 | | 4/2001 |
| WO | WO 0127821 | | 4/2001 |
| WO | WO 01/63994 A2 | | 8/2001 |
| WO | WO 01 75564 A2 | | 10/2001 |
| WO | WO 01 75565 A2 | | 10/2001 |
| WO | WO 0175595 | | 10/2001 |
| WO | WO 02/01794 A2 | | 1/2002 |
| WO | WO 02 17555 A2 | | 2/2002 |
| WO | WO 02/060121 A1 | | 8/2002 |
| WO | WO 02 086684 A2 | | 10/2002 |
| WO | WO 03/058412 A2 | | 7/2003 |

OTHER PUBLICATIONS

Heinrich, J., "MIPS R4000 Microprocessor User's Manual," 1994, MIPS Technology, Inc., Mountain View, CA, pp. 67-79.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the JAVA Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/reseacrh/paper.txt; Nov. 29, 1999; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Brands, Stefan, "Restrictive Blinding of Secret-Key Certificates", Springer-Verlag XP002201306, (1995), Chapter 3.

Davida, George I. et al., "Defending Systems Against Viruses through Cryptographic Authentication", Proceedings of the Symposium on Security and Privacy, IEEE Comp. Soc. Press, ISBN 0-8186-1939-2, (May 1989).

Intel, "IA-32 Intel Architecture Software Developer's Manual Citation: vol. 3: System Programming Guide Miscellaneous Information", (2003), pp. 13-1 through 13-24.

Kashiwagi, Kazuhiko et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).

Luke, Jahn et al., "Replacement Strategy for Aging Avionics Computers", IEEE AES Systems Magazine, XP002190614, (Mar. 1999).

Menezes, Oorschot, "Handbook of Applied Cryptography", CRC Press LLC, USA XP002201307, (1997), p. 475.

Richt, Stefan et al., "In-Circuit-Emulator Wird Echtzeittauglich", Elektronic, Franzis Verlag GMBH, Munchen, DE, vol. 40, No. 16, XP000259620, (Aug. 6, 1991), pp.100-103.

Saez, Sergio et al., "A Hardware Scheduler for Complex Real-Time Systems", Proceedings of the IEEE International Symposium on Industrial Electronics, XP002190615, (Jul. 1999), pp. 43-48.

Sherwood, Timothy et al., "Patchable Instruction ROM Architecture", Dept. of Computer Science and Engineering, University of California, San Diego, La Jolla, CA, (Nov. 2001).

Intel Corporation, "IA-64 System Abstraction Layer Specification", Intel Product Specification, Order No. 245359-001, 112 pages, Jan. 2000.

Intel Corporation, "Intel IA-64 Architecture Software Developer's Manual—vol. 2: IA-64 System Architecture", Intel Product Manual, Order No. 245318-001, pp. i, ii, 5.1-5.3, 11.1-11.8, 11.23-11.26, Jan. 2000.

Coulouris, G. et al., "Distributed Systems: Concepts and Design", 2nd Edition, Addison-Wesley Publishers Ltd., Essex, England, pp. 422-424 (1994).

Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).

Fabry, R.S., "Capability-Based Addressing", Communications of the ACM, vol. 17, No. 7, pp. 403-412 (Jul. 1974).

Frieder, G., "The Architecture and Operational Characteristics of the VMX Host Machine", IEEE Proceedings of the 15th Annual Workshop on Microprogramming, pp. 9-16, (Oct. 5, 1982).

Hewlett Packard Company, "Mobile Security Overview", pp. 1-9, (Sep. 2002).

European Patent Office, International Search Report for International Application No. PCT/US 03/08764, 7 pages (Jun. 14, 2004).

"Information Display Technique for a Terminate Stay Resident Program," IBM Technical Disclosure Bulletin, TDB-ACC-No. NA9112156, vol. 34, Issue No. 7A, pp. 156-158, (Dec. 1, 1991).

Karger, Paul A. et al., "A VMM Security Kernel for the VAX Architecture," Proceedings of the Symposium on Research in Security and Privacy, Boxborough, MA, XP010020182, ISBN: 0-8186-2060-9, pp. 2-19 (May 7, 1990).

Chien, Andrew A. et al., "Safe and Protected Execution for the Morph/AMRM Reconfigurable Processor," 7th Annual IEEE Symposium, FCCM '99 Proceedings, Los Alamitos, CA, XP010359180, ISBN: 0-7695-0375-6, pp. 209-221 (Apr. 21, 1999).

Robin, John Scott and Irvine, Cynthia E., "Analysis of the Pentium's Ability to Support a Secure Virtual Machine Monitor," Proceedings of the 9th USENIX Security Symposium, Denver, CO, XP002247347, pp. 1-17 (Aug. 14, 2000).

Compaq Computer Corporation, Hewlett-Packard Company, IBM Corporation, Intel Corporation, Microsoft Corporation. "Trusted Computing Platform Alliance (TCPA)" Main Specification Version1.1a Dec. 2001. 326 pgs.

* cited by examiner

SYSTEM AND METHOD FOR RESETTING A PLATFORM CONFIGURATION REGISTER

FIELD

The present disclosure relates generally to microprocessor systems, and more specifically to microprocessor systems that may operate in a trusted or secured environment.

BACKGROUND

The increasing number of financial and personal transactions being performed on local or remote microcomputers has given impetus for the establishment of "trusted" or "secured" microprocessor environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

One component of such a trusted microprocessor system may be a trusted platform module (TPM), as disclosed in the Trusted Computing Platform Alliance (TCPA) Main Specification, version 1. 1a,1 Dec. 1, 2001, issued by the Trusted Computing Platform Alliance (available at www.trustedpc.com at the time of filing of the present application). The TPM may include several special registers, called platform configuration registers (PCR). The PCRs may be used to store encrypted digests of files, including software programs, which may later be retrieved to further the process of authentication. As the contents of these PCRs are therefore significant to the secure or trusted nature of the system, the PCRs should not be reset by general-purpose operations of the system. Current design limits the PCRs to be reset only upon a general system reset (e.g. power-on reset).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for resetting or modifying special registers used in a trusted or secured environment in a microprocessor system. In the following description, numerous specific details such as logic implementations, software module allocation, encryption techniques, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a microprocessor system. However, the invention may be practiced in other forms of processor such as a digital signal processor, a minicomputer, or a mainframe computer.

In one embodiment, a new kind of platform configuration register (PCR) is used in conjunction with a trusted platform module (TPM) within a security token. Each new PCR may have associated with it a pair of flags that may be used to indicate whether or not the PCR may be either reset or have its contents modified. The security token may have a bus interface that may receive special locality-confirming messages. These locality-confirming messages may indicate both that the security token is in direct physical connection with other system resources and also that trusted software desires to reset or modify PCR contents.

Figure 1:
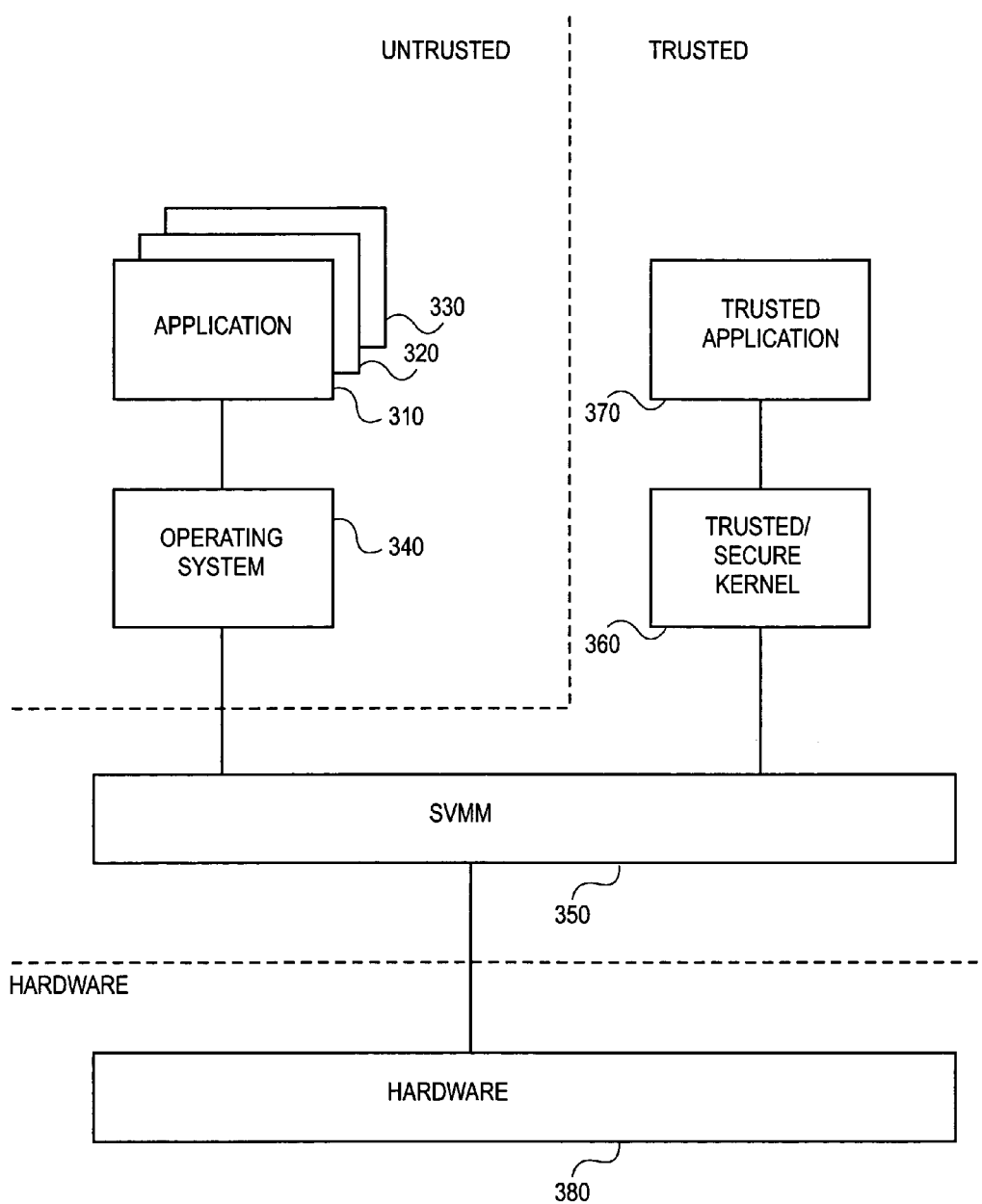
FIG. 1 is a diagram of an exemplary trusted or secured software environment, according to one embodiment of the present invention.

Referring now to FIG. 1, a diagram of an exemplary trusted or secured software environment is shown, according to one embodiment of the present invention. In the FIG. 1 embodiment, trusted and untrusted software may be loaded simultaneously and may execute simultaneously on a single computer system. A secure virtual machine monitor (SVMM) 350 selectively permits or prevents direct access to hardware resources 380 from one or more untrusted operating systems 340 and untrusted applications 310 through 330. In this context, "untrusted" does not necessarily mean that the operating system or applications are deliberately misbehaving, but that the size and variety of interacting code makes it impractical to reliably assert that the software is behaving as desired, and that there are no viruses or other foreign code interfering with its execution. In a typical embodiment, the untrusted code might consist of the normal operating system and applications found on today's personal computers.

SVMM 350 also selectively permits or prevents direct access to hardware resources 380 from one or more trusted or secure kernels 360 and one or more trusted applications 370. Such a trusted or secure kernel 360 and trusted applications 370 may be limited in size and functionality to aid in the ability to perform trust analysis upon it. The trusted application 370 may be any software code, program, routine, or set of routines which is executable in a secure environment. Thus, the trusted application 370 may be a variety of applications, or code sequences, or may be a relatively small application such as a Java applet.

Instructions or operations normally performed by operating system 340 or kernel 360 that could alter system resource protections or privileges may be trapped by SVMM 350, and selectively permitted, partially permitted, or rejected. As an example, in a typical embodiment, instructions that change the processor's page table that would normally be performed by operating system 340 or kernel 360 would instead be trapped by SVMM 350, which would ensure that the request was not attempting to change page privileges outside the domain of its virtual machine.

Figure 2:
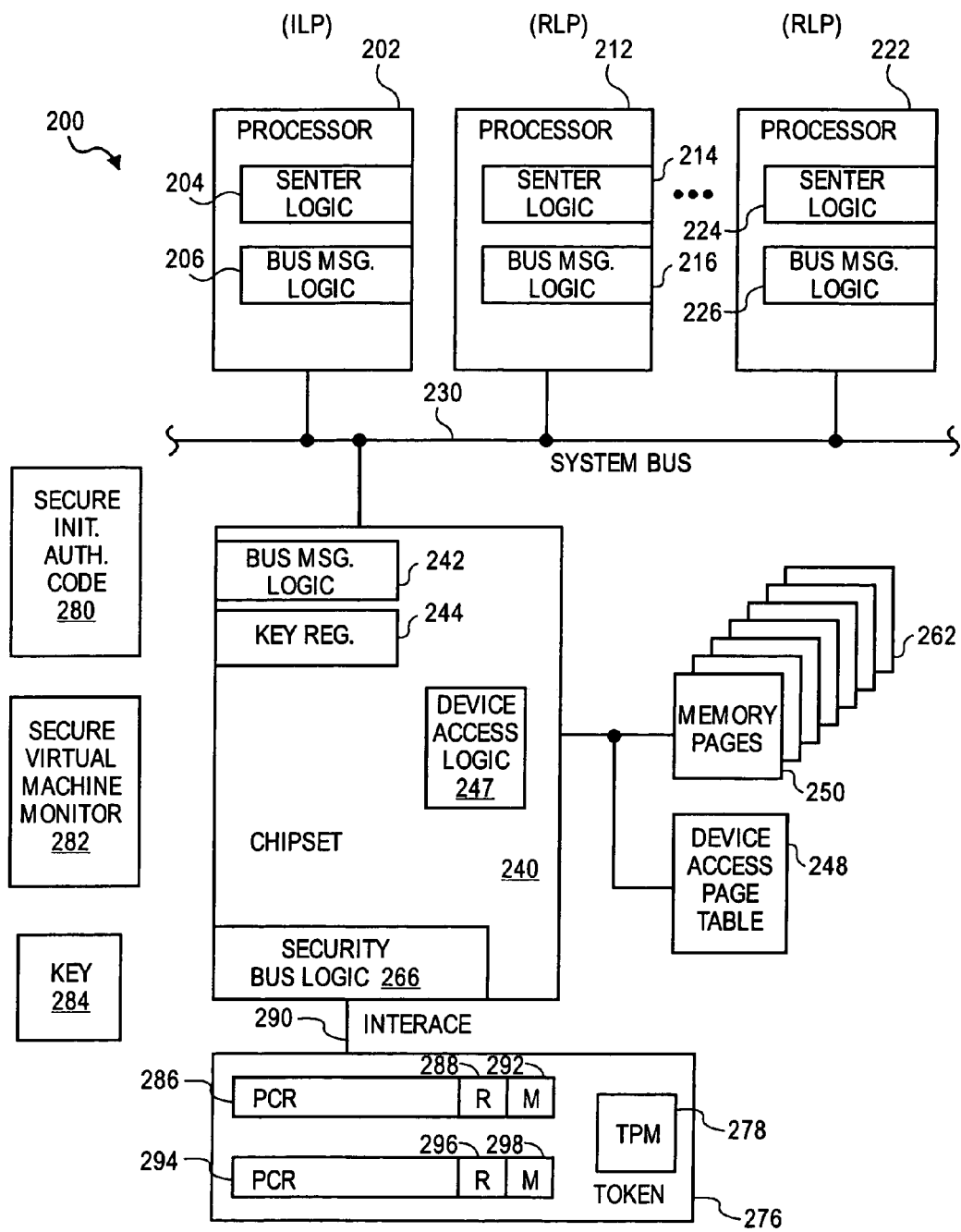
FIG. 2 is a diagram of certain exemplary trusted or secured software modules and exemplary system environment, according to one embodiment of the present invention.

Referring now to FIG. 2, a diagram of certain exemplary trusted or secured software modules and exemplary system environment 200 is shown, according to one embodiment of the present invention. In the FIG. 2 embodiment, processor 202, processor 212, processor 222, and optional other processors (not shown) are shown. In other embodiments, the number of processors may differ, as may the boundary of various components and functional units.

Processors 202, 212, 222 may contain certain special circuits or logic elements to support secure or trusted operations. For example, processor 202 may contain secure enter (SENTER) logic 204 to support the execution of special SENTER instructions that may initiate trusted operations. SENTER is one example of a privileged instruction, defined as a machine instruction that usually can only be executed when in a special mode and usually available to the operating system or systems but not to other users. Privileged operations may occur upon the execution of privileged instructions. Processor 202 may also contain bus message logic 206 to support special bus messages on system bus 230 in support of special SENTER operations. In alternate embodiments, memory control functions of chipset 240 may be allocated to circuits within the processors, and for multiple processors may be included on a single die. In these embodiments, special bus messages may also be sent on busses internal to the processors. The use of special bus messages may increase the security or trustability of the system for several reasons. Circuit elements such as processors 202, 212, and 222 or chipset 240 may only issue or respond to such messages if they contain the appropriate logic elements of embodiments of the present disclosure, or their equivalents. Therefore successful exchange of the special bus messages may help ensure proper system configuration. Special bus messages may also permit activities that should normally be prohibited, such as resetting a platform configuration register 286. The ability of potentially hostile untrusted code to spy on certain bus transactions may be curtailed by allowing special bus messages to be issued only in response to special security instructions.

Additionally, processor 202 may contain secure memory to support secure initialization operations. In one embodiment secure memory 208 may be an internal cache of processor 202, perhaps operating in a special mode.

A "chipset" may be defined as a group of circuits and logic that support memory and input/output (I/O) operations for a connected processor or processors. Individual elements of a chipset may be grouped together on a single chip, a pair of chips, or dispersed among multiple chips, including processors. In the FIG. 2 embodiment, chipset 240 may include circuitry and logic to support memory and I/O operations to support processors 202, 212, and 222. In one embodiment, chipset 240 may interface with a number of memory pages 250 through 262 and a device-access page table 248 containing control information indicating whether non-processor devices may access the memory pages 250 through 262. Chipset 240 may include device-access logic 247 that may permit or deny direct memory access (DMA) from I/O devices to selected portions of the memory pages 250 through 262. In some embodiment the device access logic 247 may contain all relevant information required to permit or deny such accesses. In other embodiments, the device access logic 247 may access such information held in the device access page table 248. The functions of chipset 240 may further be allocated among one or more physical devices in alternate embodiments. Chipset 240 may additionally include its own bus message logic 242 to support special bus messages on system bus 230 in support of special SENTER operations.

Chipset 240 may support standard I/O operations on I/O busses such as peripheral component interconnect (PCI), accelerated graphics port (AGP), universal serial bus (USB), low pin count (LPC) bus, or any other kind of I/O bus (not shown). An interface 290 may be used to connect chipset 240 with token 276, containing one or more platform configuration registers (PCR) 286, 294. In one embodiment, interface 290 may be the LPC bus (Low Pin Count (LPC) Interface Specification, Intel Corporation, rev. 1.0, 29 Dec. 1997) modified with the addition of certain security enhancements. One example of such a security enhancement would be a locality confirming message, utilizing a previously-reserved message header and address information targeting a platform configuration register (PCR) 286 within token 276. In one embodiment, token 276 may contain special security features, and in one embodiment may include the trusted platform module (TPM) 278 disclosed in the Trusted Computing Platform Alliance (TCPA) Main Specification, version 1.1a, 1 Dec. 2001, issued by the TCPA (available at the time of filing of the present application at www.trustedpc.com). The interface 290 may provide a data path for various two-way communications between chipset 240 and token 276. The security bus logic 266 of chipset 240 may include circuits to generate and transmit locality-confirming messages to token 276.

Two software components identified in system environment 200 are a Secure Virtual Machine Monitor (SVMM) 282 module and a Secure Initialization Authenticated Code (SINIT-AC) 280 module. The SVMM 282 module may be stored on a system disk or other mass storage, and moved or copied to other locations as necessary. In one embodiment, prior to beginning the secure launch process SVMM 282 may be moved or copied to one or more memory pages 250 through 262. Following the secure enter process, a virtual machine environment may be created in which the SVMM 282 may operate as the most privileged code within the system, and may be used to permit or deny direct access to certain system resources by the operating system or applications within the created virtual machines.

Some of the actions required by the secure enter process may be beyond the scope of simple hardware implementations, and may instead advantageously use a software module whose execution can be implicitly trusted. In one embodiment, these actions may be performed by Secure Initialization (SINIT) code. Such action may include checking critical portions of the system configuration to ensure that is supports the correct instantiation of the secure environment, configuring the device access logic 247 and device access page table 248, and calculate and register the SVMM 282 identity prior to transferring system control to it. Here "register" means placing a trust measurement of SVMM 282 into a register, for example into PCR 286 or into PCR 294. When this last action is taken, the trustworthiness of the SVMM 282 may be inspected by a potential system user.

The SINIT code may be produced by the manufacturer of the processors or of the chipsets. For this reason, the SINIT code may be trusted to aid in the secure launch of chipset 240. In order to distribute the SINIT code, in one embodiment a well-known cryptographic hash is made of the entire SINIT code, producing a value known as a "digest". One embodiment produces a 160-bit value for the digest. The digest may then be encrypted by a private key, held in one embodiment by the manufacturer of the processor, to form a digital signature. When the SINIT code is bundled with the corresponding digital signature, the combination may be referred to as SINIT authenticated code (SINIT-AC) 280. Copies of the SINIT-AC 280 may be later validated as discussed below.

Any logical processor may initiate the secure launch process, and may then be referred to as the initiating logical processor (ILP). In the present example processor 202 becomes the ILP, although any of the processors on system bus 230 could become the ILP. Neither memory-resident copy of SINIT-AC 280 nor memory-resident copy of SVMM 282 may be considered trustworthy at this time since, among other reasons, the other processors or the DMA devices may overwrite memory pages 250–262.

The ILP (processor 202) then executes a privileged instruction. This privileged instruction may in one embodiment be referred to as a secured enter (SENTER) instruction, and may be supported by SENTER logic 204. Execution of the SENTER instruction may cause the ILP (processor 202) to issue special bus messages on system bus 230. In other embodiments, other privileged instructions may be executed.

After issuing the special bus message, the ILP (processor 202) may check to see when and if the other processors, which may be referred to as responding logical processors (RLPs) are ready to enter secure operations. When the RLPs are ready, the ILP (processor 202) may move both a copy of SINIT-AC 280 and key 284 into secure memory for the purpose of authenticating and subsequently executing the SINIT code included in SINIT-AC 280. In one embodiment, this secure memory may be an internal cache of the ILP (processor 202), perhaps operating in a special mode. Key 284 represents the public key corresponding to the private key used to encrypt the digital signature included in the SINIT-AC 280 module, and is used to verify the digital signature and thereby authenticate the SINIT code. In one embodiment, key 284 may already be stored in the processor, perhaps as part of the SENTER logic 204. In another embodiment, key 284 may be stored in a read-only key register 244 of chipset 240, which is read by the ILP. In yet another embodiment, either the processor or the chipset's key register 244 may actually hold a cryptographic digest of key 284, where key 284 itself is included in the SINIT-AC 280 module. In this last embodiment, the ILP reads the digest from key register 244, calculates an equivalent cryptographic hash over the key 284 embedded in SINIT-AC 280, and compares the two digests to ensure the supplied key 284 is indeed trusted.

A copy of SINIT-AC and a copy of a public key may then exist within secure memory. The ILP may now validate the copy of SINIT-AC by decrypting the digital signature included in the copy of the SINIT-AC using the copy of a public key. This decryption produces an original copy of a cryptographic hash's digest. If a newly-calculated digest matches this original digest then the copy of SINIT-AC and its included SINIT code may be considered trustable.

The ILP may now register the unique identity of the SINIT-AC module by writing the SINIT-AC module's cryptographic digest value to a platform configuration register 286 in the security token 276, as outlined below. The ILP's execution of its SENTER instruction may now terminate by transferring execution control to the trusted copy of the SINIT code held within the ILP's secure memory. The trusted SINIT code may then perform its system test and configuration actions and may register the memory-resident copy of SVMM, in accordance with the definition of "register" above.

Registration of the memory-resident copy of SVMM may be performed in several manners. In one embodiment, the SENTER instruction running on the ILP writes the calculated digest of SINIT-AC into PCR 286 within the security token 276. Subsequently, the trusted SINIT code may write the calculated digest of the memory-resident SVMM to the same PCR 286 or another PCR 294 within the security token 276. If the SVMM digest is written to the same PCR 286, the security token 276 hashes the original contents (SINIT digest) with the new value (SVMM digest) and writes the result back into the PCR 286. In embodiments where the first (initializing) write to PCR 286 is limited to the SENTER instruction, the resulting digest may be used as a root of trust for the system.

Once the trusted SINIT code has completed its execution, and has registered the identity of the SVMM in a PCR, the SINIT code may transfer ILP execution control to the SVMM. In a typical embodiment, the first SVMM instructions executed by the ILP may represent a self-initialization routine for the SVMM. The ILP may in one embodiment cause each of the RLPs to join in operations under the supervision of the now-executing copy of SVMM. From this point onwards, the overall system is operating in trusted mode as outlined in the discussion of FIG. 1 above.

Figure 3:
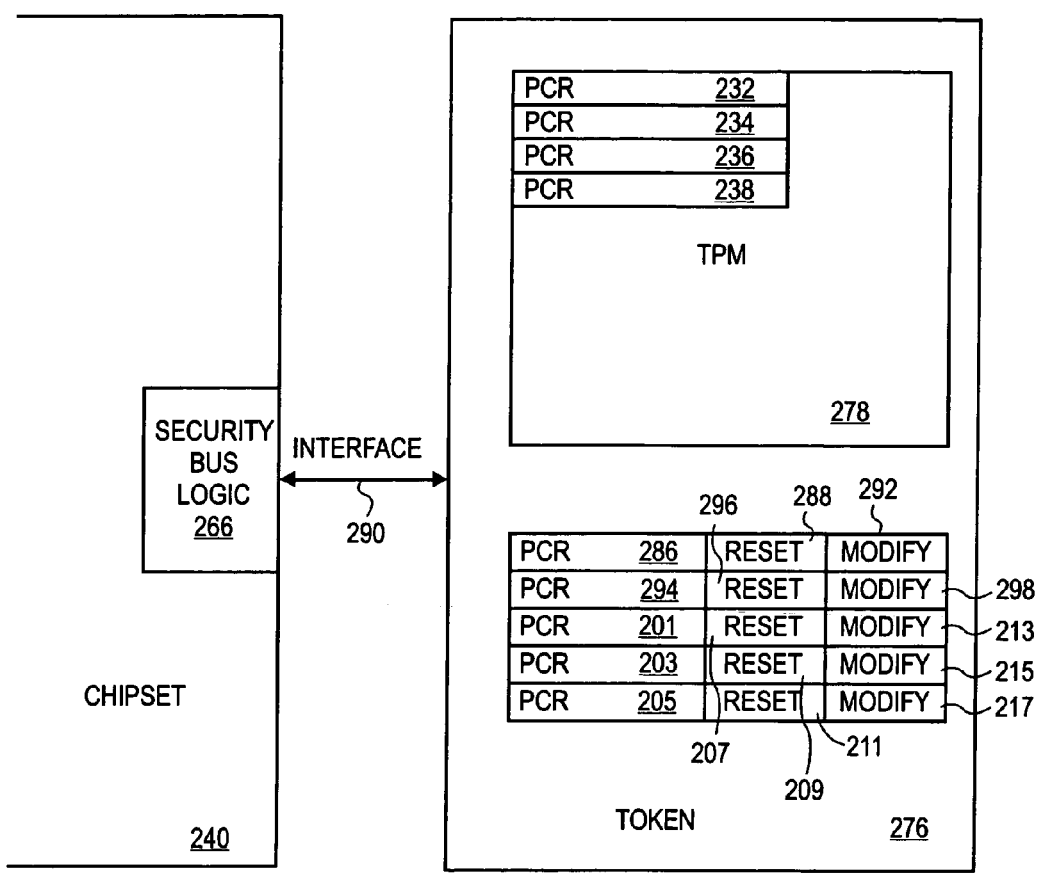
FIG. 3 is a detailed diagram of the security token of the system of FIG. 2A, according to one embodiment of the present invention.

Referring now to FIG. 3, a detailed diagram of the security token 276 of the system of FIG. 2 is shown, according to one embodiment of the present invention. Token 276 may include a TPM 278 containing several prior-art PCRs 232, 234, 236, 238. These prior-art PCRs may be reset only at a general system reset event. The present TPM 278 may contain 16 or more prior-art general-purpose PCRs.

Additionally, in one embodiment token 276 may include PCRs 286, 294 of the present invention. Each PCR 286, 294 may be associated with flags indicating the behavior of the PCR under differing conditions. For example, PCR 286 has associated with it a reset flag 288 and a modify flag 292, and PCR 294 has associated with it a reset flag 296 and a modify flag 298. When reset flag 288 has the logical value true, PCR 286 may be reset under the command of a locality-confirming message arriving on the interface 290. When modify flag 292 has the logical value true, PCR 286 may have its contents modified under the command of a locality-confirming message arriving on the interface 290. In one embodiment, an encrypted digest of SINIT-AC 280 is intended to be written into PCR 286 and an encrypted digest of SVMM 282 is intended to be written into PCR 294. These digests may be exhibited upon request as part of an attestation process that may demonstrate to a local or remote user that system environment 200 is operating in a secure or trusted manner.

In another embodiment, digests of SINIT-AC 280 and of SVMM 282 may be written into a single PCR, such as PCR 286. In this embodiment, first the digest of SINIT-AC is written into PCR 286. Then the contents of PCR 286 are cryptologically combined with a digest of SVMM 282, and the resulting combined digest written into PCR 286. In one embodiment, circuitry within token 276, configured to support PCR 286, may take the value of an incoming write request over interface 290, cryptologically combine this value with the current value within PCR 286, and then place the resulting new value within PCR 286. This process may be referred to as an "extend" operation. The value of the incoming write request may be said to be "extended onto" the current value within PCR 286. This extended value within PCR 286, representing a combined digest, may then be exhibited upon request as part of an attestation process that may demonstrate to a local or remote user that system environment 200 is operating in a secure or trusted manner.

Reset flags 288, 296 and modify flags 292, 298 may be set to logic true values at the time of manufacture of token 276. This will permit the resetting and content modification of PCR 286, 294 upon receipt of a locality-confirming bus message on interface 290. In other embodiments, reset flags 288, 296 and modify flags 292, 298 may have their values changed between true and false depending upon specific security actions taken under the control of TPM 278.

In the FIG. 3 embodiment, exemplary additional PCRs 201, 203, and 205 of an embodiment are shown. In alternate embodiments fewer or additional PCRs in accordance with an embodiment of the present invention may be utilized. Additional PCRs such as PCRs 201, 203, and 205 may be utilized to store security-related information, such as digests of code, in other embodiments. Any additional PCRs, such as exemplary PCRs 201, 203, and 205, may have the associated reset flags 207, 209, and 211, respectively, and the associated modify flags 213, 215, and 217, respectively.

The PCRs 286, 294 may be reset or modified at times other than general system resets when the system environment 200 causes locality-confirming messages to be sent from chipset 240 to token 276. In one embodiment, the locality-confirming messages may be generated by security bus logic 266 of chipset 240 in response to the bus message logic 242 receiving a SENTER special bus message over system bus 230. The SENTER special bus message in turn may result from the execution of a SENTER instruction in a processor. Such a SENTER instruction may be executed days, weeks, or months subsequent to any general system reset event. Details of the SENTER process, transferring system operation from insecure operations to secure operations, are described below in connection with FIGS. 3 through 6.

In the FIG. 3 embodiment, token 276 is shown in an exemplary trusted or secure personal computer environment. Specifically, token 276 is shown connected with chipset 240 via an interface 290. In alternate embodiments, token 276 of an embodiment of the present invention may be used in other system environments. Examples of such environments may include a data server environment, a cellular or other form of mobile telephone, a mobile data port, an automotive system, a cable or satellite television system, or a personal digital assistant (PDA). These examples should not be construed as limiting, as there are many other system environments that may utilize a token of a present embodiment. An interface 290 or alternate equivalent interface may connect the other embodiment token to circuitry within one of the above exemplary system environments, wherein chipset 240 may be a portion of, for example, an integrated cellular telephone controller or a PDA controller. These embodiments are in accordance with the definition of "chipset" included in the discussion of FIG. 2 above.

Figure 4:
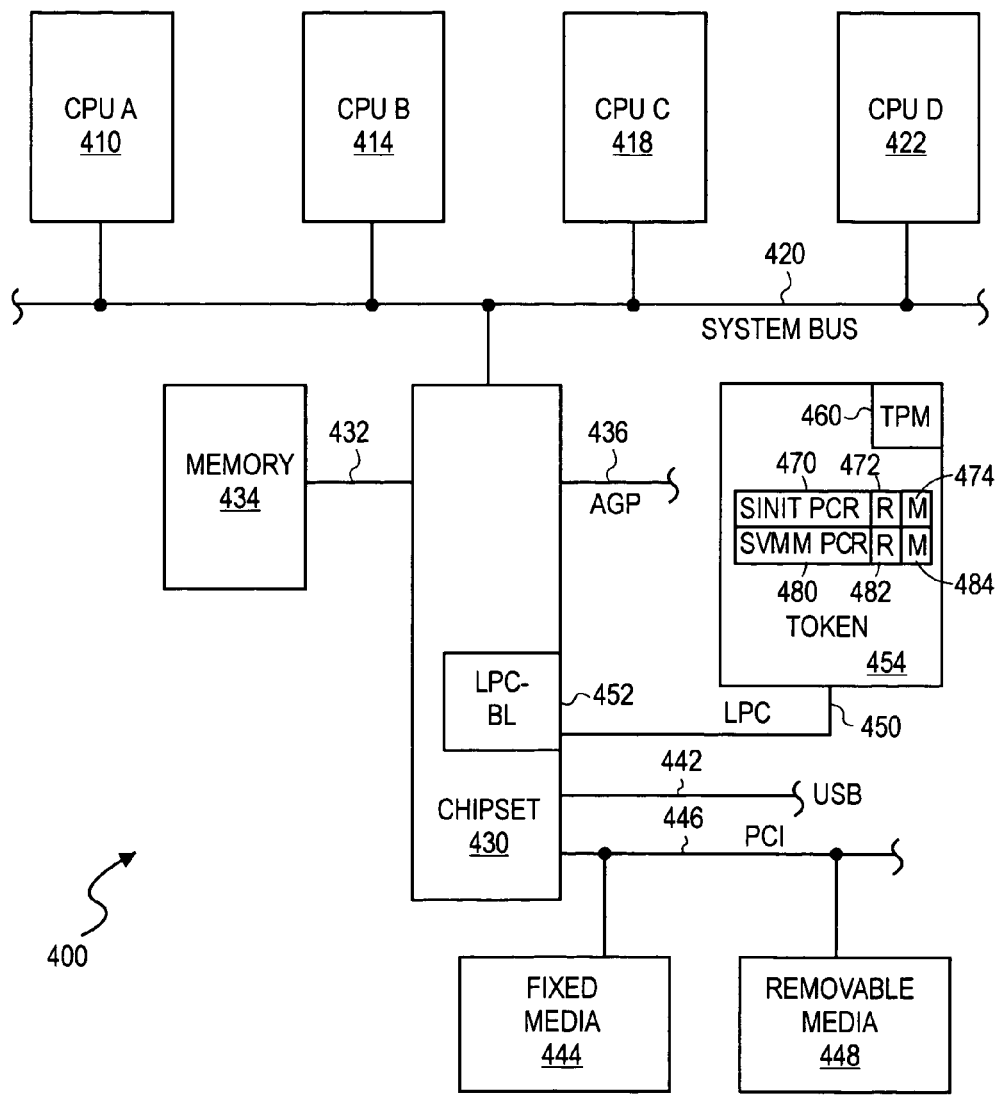
FIG. 4 is a schematic diagram of an exemplary microprocessor system adapted to support the secured software environment of FIG. 1, according to one embodiment of the present invention.

Referring now to FIG. 4, one embodiment of a microprocessor system 400 adapted to support the secured software environment of FIG. 1 is shown. CPU A 410, CPU B 414, CPU C 418, and CPU D 422 may be similar to the processors of FIG. 1, but may be configured with additional microcode or logic circuitry to support the execution of special instructions. In one embodiment, this additional microcode or logic circuitry may be the SENTER logic 204 of FIG. 2. These special instructions may support the issuance of special bus messages on system bus 420. In one embodiment, the issuance of special bus messages may be supported by circuitry such as the bus message logic 206 of FIG. 2. Similarly chipset 430 may be similar to chipset 130 but may support the above-mentioned special cycles on system bus 420. Additionally chipset 430 may possess additional page protection circuitry for protecting page tables within physical memory 434. In one embodiment, the page protection circuitry may be the device access logic 247 of FIG. 2.

In one embodiment, chipset 430 interfaces an additional data bus called a modified low pin count (LPC) bus 450 through a LPC bus logic (LPC-BL) 452. Modified LPC bus 450 may be used to connect chipset 430 with a security token 454. Token 454 may in one embodiment include the trusted platform module (TPM) 460 envisioned by the TCPA. In one embodiment, token 454 may include SINIT PCR 470 and SVMM PCR 480. Each PCR 470, 480 may be associated with flags indicating the behavior of the PCR under differing conditions. For example, SINIT PCR 470 has associated with it a reset flag 472 and a modify flag 474, and SVMM PCR 480 has associated with it a reset flag 482 and a modify flag 484. When reset flag 472 has the logical value true, SINIT PCR 470 may be reset under the command of a locality-confirming message arriving on the modified LPC bus 450. When modify flag 474 has the logical value true, SINIT PCR 470 may have its contents modified under the command of a locality-confirming message arriving on the modified LPC bus 450. In one embodiment, an encrypted digest of SINIT-AC is intended to be written into SINIT PCR 470 and an encrypted digest of SVMM is intended to be written into SVMM PCR 480. These digests may be exhibited upon request as part of an attestation process that may demonstrate to a local or remote user that microprocessor system 400 is operating in a secure or trusted manner.

In an alternate embodiment, digests of SINIT-AC and of SVMM may be written into a single PCR, such as SINIT PCR 470. In this embodiment, first the digest of SINIT-AC is written into SINIT PCR 470. Then the contents of SINIT PCR 470 are cryptologically combined with a digest of SVMM, and the resulting combined digest written into SINIT PCR 470. In one embodiment, circuitry within token 454, configured to support SINIT PCR 470, may take the value of an incoming write request over modified PC bus 450, cryptologically combine this value with the current value within SINIT PCR 470, and then place the resulting new value within SINIT PCR 470. This combined digest may then be exhibited upon request as part of an attestation process that may demonstrate to a local or remote user that microprocessor system 400 is operating in a secure or trusted manner.

Reset flags 472, 482 and modify flags 474, 484 may be set to logic true values at the time of manufacture of token 454. This will permit the resetting and content modification of SINIT PCR 470 and SVMM PCR 480 upon receipt of a locality-confirming bus message on modified LPC bus 450. In other embodiments, reset flags 472, 482 and modify flags 474, 484 may have their values changed between true and false depending upon specific security actions taken within microprocessor system 400, such as a SENTER or other privileged instruction execution.

In order to use a SVMM 350 in a microprocessor system such as microprocessor system 400, several actions may need to be taken. One action may be that the system configuration should be tested for trustworthiness, both in terms of hardware configuration, the SVMM 350 itself, and any software that loads and starts the SVMM 350. Another action may be to register the SVMM 350 identity and transfer system control to it. When this last action is taken the trustworthiness of the SVMM 350 may be inspected by a potential system user.

In one embodiment, a copy of SINIT-AC may be stored in the fixed media 444 for use when the microprocessor system 400 needs to enter secure operations. When a logical processor, for example physical processor CPU 414, desires to initialize system wide secure operations using the SVMM 350, it may load a copy of SINIT-AC into memory 434 to form a memory-resident copy of SINIT-AC. Any logical processor starting up secure operations in this manner may be referred to as an initiating logical processor (ILP). In the present example CPU B 414 becomes the ILP. CPU B 414 as ILP may then load a copy of SVMM into memory to form a memory-resident copy of SVMM. This copy of SVMM may be on non-contiguous pages of memory, but the chipset 430 will maintain a page table for it. Neither SINIT-AC nor SVMM may be considered trustworthy at this time since, among other reasons, the other processors or the DMA devices may overwrite memory 434.

The ILP then may execute a special or privileged instruction implemented in microcode or other processor logic, such as SENTER. Execution of the SENTER instruction may cause the ILP to issue special bus messages on system bus 420, and then wait considerable time intervals for subsequent system actions. In other embodiments, other privileged instructions may be executed.

After issuing the special bus message, the ILP (CPU B 414) checks to see when and if all the RLPs have properly responded. When the RLPs are ready to enter secure operations, the ILP may move both the memory-resident copy of SINIT-AC and a cryptographic public key of chipset 430 into secure memory. In one embodiment, this secure memory may be the internal cache of the ILP, CPU B 414. Copy of SINIT-AC and copy of public key may then exist within internal cache. The ILP may now validate the cache-resident copy of SINIT-AC by decrypting the digital signature of this copy of the SINIT-AC using the cache-resident copy of public key. This decryption produces an original copy of a cryptographic hash's "digest". If a newly-calculated "digest" matches this original "digest" then the cache-resident copy of SINIT-AC may be considered trustable.

At this point during the execution of the SENTER instruction, a pair of locality-confirming messages may be generated by LPC-BL 452. This allows the resetting of SINIT PCR 470 and the writing of the SINIT digest into SINIT PCR 470.

The ILP may now issue another special bus message, via system bus 420 signaling the waiting RLP's (CPU A 410, CPU C 418, CPU D 422) and chipset 430 that secured operations are going to be initiated. The trusted cache-resident copy of SINIT-AC may then test and validate the copy of SVMM residing in physical memory 434. In one embodiment, SINIT-AC may read the page table entries for the copy of SVMM located in memory 434. SINIT-AC may then command chipset 430 to prevent DMA access from I/O devices to those page table entries. Validation and subsequent registration of the memory-resident copy of SVMM may be performed in several manners. Again during this portion of the execution of the SENTER instruction, another pair of locality-confirming messages may be generated by LPC-BL 452. This allows the resetting of SVMM PCR 480 and the writing of the SVMM digest into SVMM PCR 480.

At this point the memory-resident copy of SVMM may begin execution, at the ending of execution of the SENTER instruction. The ILP may in one embodiment cause each of the RLPs to join in operations under the supervision of the now-executing memory-resident copy of SVMM. From this point onwards the overall system is operating in trusted mode as outlined in the discussion of FIG. 1 above.

Figure 5:
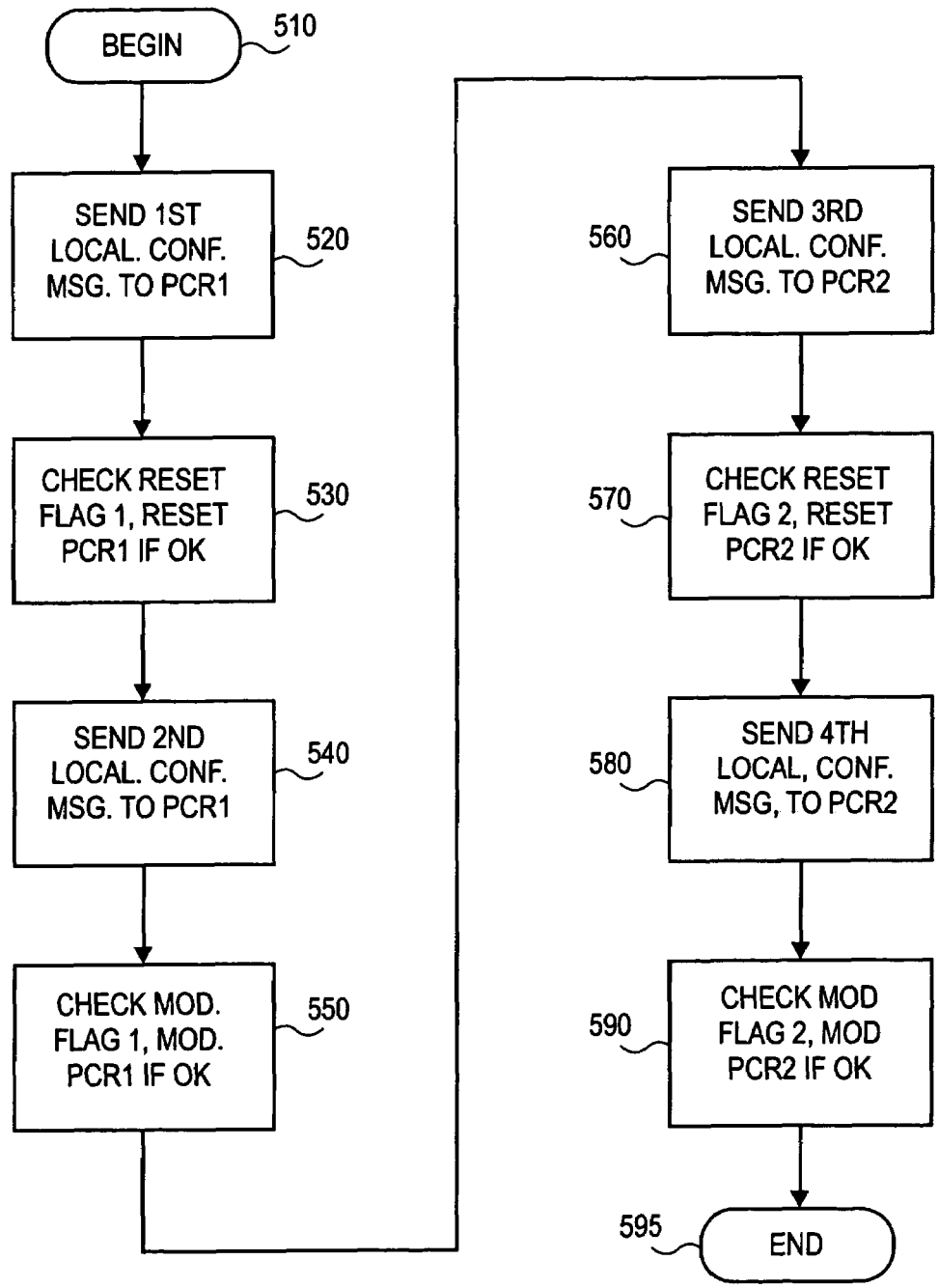
FIG. 5 is a flowchart showing resetting of platform configuration registers, according to one embodiment of the present invention.

Referring now to FIG. 5, a flowchart showing resetting of platform configuration registers is shown, according to one embodiment of the present invention. The method shown in FIG. 5 may be used for the secure or trusted computer environments of FIG. 1 and FIG. 3. The method may also be used in other environments, such as a cellular or other form of mobile telephone, automobile or other security systems, or in a digital or satellite television or other media exchange system. In these latter embodiments, circuits within the named equipment may serve as the equivalent of the chipset 240 or chipset 430 for the purpose of sending locality-confirming messages to a security token.

The FIG. 5 embodiment starts in block 520, where a first locality-confirming message is sent over an interface, addressed to a first PCR. Data within the first locality-confirming message indicates a reset is to be performed, and in block 530 the reset flag of the first PCR is checked to see if resets may be allowed. If so, then the first PCR is reset. Then in block 540 a second locality-confirming message is sent, addressed to the first PCR. Data within the second locality-confirming message indicates a digest (or other data) write is to be performed, and in block 550 the modify flag of the first PCR is checked to see if modifications to the value contained within the first PCR may be allowed. If so, then the first PCR is written with the digest contained within the second locality-confirming message.

In block 560, a third locality-confirming message may then be sent that is addressed to a second PCR. Data within the third locality-confirming message indicates a reset is to be performed, and in block 570 the reset flag of the second PCR is checked to see if resets may be allowed. If so, then the second PCR is reset. Then in block 580 a fourth locality-confirming message is sent, addressed to the second PCR. Data within the fourth locality-confirming message indicates a digest (or other data) write is to be performed, and in block 590 the modify flag of the second PCR is checked to see if modifications to the value contained within the second PCR may be allowed. If so, then the second PCR is written with the digest contained within the fourth locality-confirming message.

Figure 6:
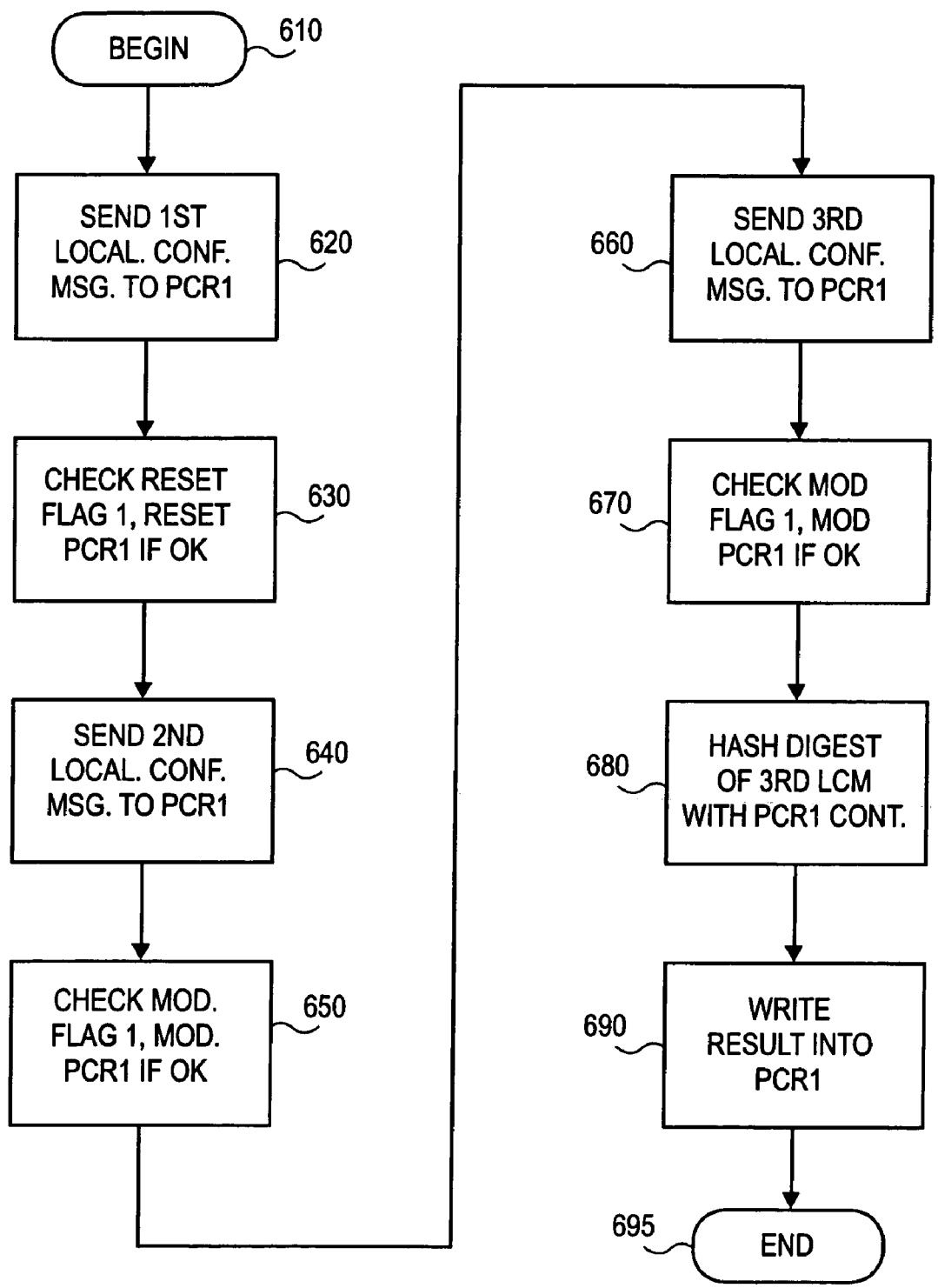
FIG. 6 is a flowchart showing resetting of platform configuration registers, according to another embodiment of the present invention.

Referring now to FIG. 6, a flowchart showing resetting of platform configuration registers is shown, according to another embodiment of the present invention. The method of FIG. 6 may be used in various environments as listed above in connection with the method of FIG. 5. The FIG. 6 embodiment starts in block 620, where a first locality-confirming message is sent over an interface, addressed to a first PCR. Data within the first locality-confirming message indicates a reset is to be performed, and in block 630 the reset flag of the first PCR is checked to see if resets may be allowed. If so, then the first PCR is reset. Then in block 640 a second locality-confirming message is sent, addressed to the first PCR. Data within the second locality-confirming message indicates a digest (or other data) write is to be performed, and in block 650 the modify flag of the first PCR is checked to see if modifications to the value contained within the first PCR may be allowed. If so, then the first PCR is written with the digest contained within the second locality-confirming message.

Then in block 660 a third locality-confirming message is sent, addressed again to the first PCR. Data within the third locality-confirming message indicates a digest (or other data) write is to be performed, and in block 670 the modify flag of the first PCR is checked to see if modifications to the value contained within the first PCR may still be allowed. If so, then in block 680 the token cryptographically hashes the digest contained within the third locality-confirming message onto the existing contents of the first PCR. Then in block 690 the resulting combined digest may be written into the first PCR. This process may be the extend process as described above in connection with FIG. 2.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
    a circuit including a first register, with a first flag coupled to said first register;
    a first bus coupled to said circuit to convey a locality confirming message wherein said first flag indicates permission to reset said first register; and
    a second flag coupled to said first register to indicate permission to modify a content of said first register.

2. The system of claim 1, wherein said first flag coupled to said first register indicates permission to modify a content of said first register.

3. The system of claim 2, wherein said content of said first register is capable of being modified during execution of a privileged instruction by a processor.

4. The system of claim 3, further comprising a second register to contain a second digest of a second code.

5. A system, comprising:
    a circuit including a first register;
    a first bus coupled to said circuit to convey a locality confirming message;
    a chipset to transmit said locality confirming message across said first bus, wherein said chipset transmits said locality confirming message responsively to a special bus message; and
    a processor to transmit said special bus message on said second bus, wherein said processor transmits said special bus message during an execution of a privileged instruction.

6. An apparatus, comprising:
    a first register to store a first digest;
    a first flag coupled to said first register to indicate whether to permit said first register to reset responsive to a locality confirming message; and
    a second flag coupled to said first register to indicate whether to permit contents of said first register to change responsive to said locality confirming message.

7. An apparatus, comprising:
    a first register to store a first digest; and
    a first flag coupled to said first register to indicate whether to permit said first register to reset responsive to a locality confirming message;
    a second register to store a second digest;
    a third flag coupled to said second register to indicate whether to permit said second register to reset responsive to said locality confirming message; and
    a fourth flag coupled to said second register to indicate whether to permit contents of said second register to change responsive to said locality confirming message.

8. A method, comprising:
    transmitting a first locality confirming message on a first bus;
    determining whether to reset a first register responsively to said first locality confirming message;
    determining whether to reset said first register responsive to a first flag;
    transmitting a second locality confirming message on said first bus;
    determining whether to modify a first content of said first register responsively to said second locality confirming message; and
    determining whether to modify said first content of said first register responsive to a second flag.

9. The method of claim 8, further comprising transmitting a third locality confirming message on said first bus; and further comprising determining whether to reset a second register responsively to said third locality confirming message.

10. The method of claim 9, further comprising transmitting a fourth locality confirming message on said first bus; and further comprising determining whether to modify a second content of said second register responsively to said fourth locality confirming message.

11. The method of claim 8, further comprising transmitting a third locality confirming message on said first bus; and further comprising determining whether to modify a second content of said first register responsively to said third locality confirming message.

12. The method of claim 9, further comprising modifying said second content of said first register using a cryptological combination with a digest.

13. An apparatus, comprising:
    a first register to store a first digest;
    a first flag coupled to said first register to indicate whether to permit contents of said first register to be modified responsive to a locality confirming message; and
    a second flag coupled to said first register to indicate whether to permit said first register to reset responsive to said locality confirming message.

\* \* \* \* \*